Aug. 31, 1965   J. H. ASHBY   3,203,290
MICROTOMES
Filed June 7, 1963   8 Sheets-Sheet 1

Inventor
JOHN HENRY ASHBY
By Cushman, Darby & Cushman
Attorneys

Aug. 31, 1965  J. H. ASHBY  3,203,290
MICROTOMES
Filed June 7, 1963  8 Sheets-Sheet 4
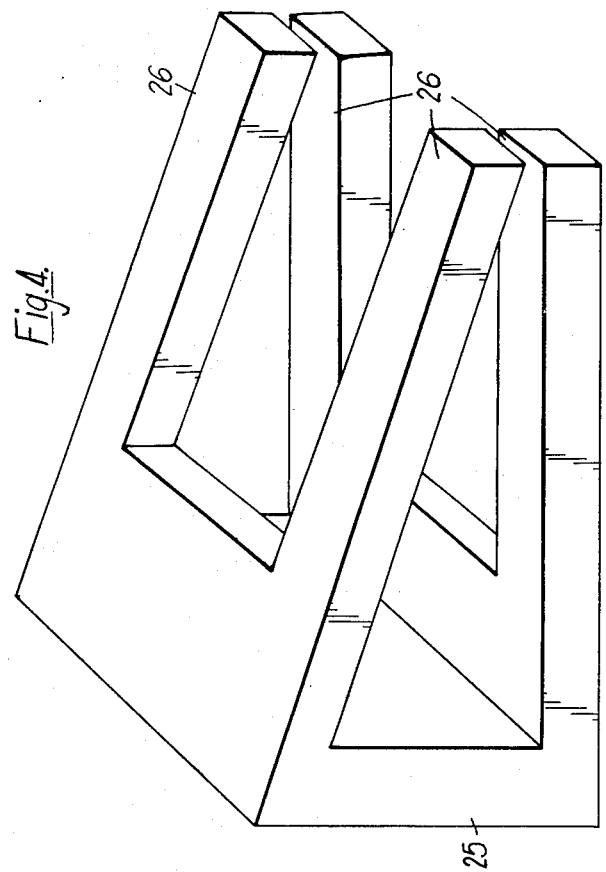
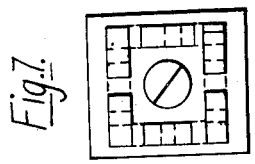
Inventor
JOHN HENRY ASHBY
By
Cushman, Darby & Cushman
Attorneys Aug. 31, 1965     J. H. ASHBY     3,203,290
MICROTOMES
Filed June 7, 1963     8 Sheets-Sheet 5
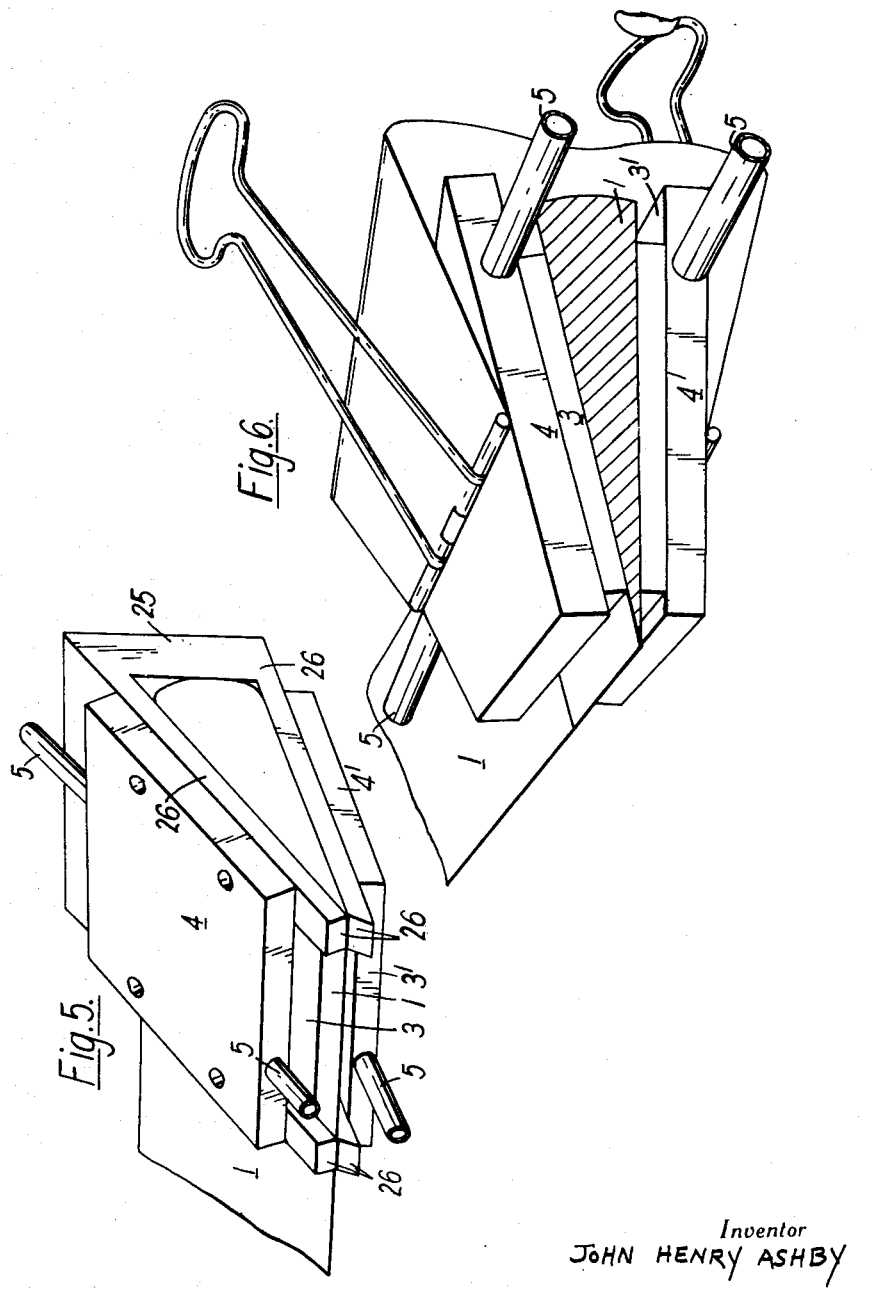
Inventor
JOHN HENRY ASHBY
By
Cushman, Darby & Cushman
Attorneys Aug. 31, 1965    J. H. ASHBY    3,203,290
MICROTOMES Filed June 7, 1963    8 Sheets-Sheet 6

Inventor
JOHN HENRY ASHBY
By
Cushman, Darby & Cushman
Attorneys

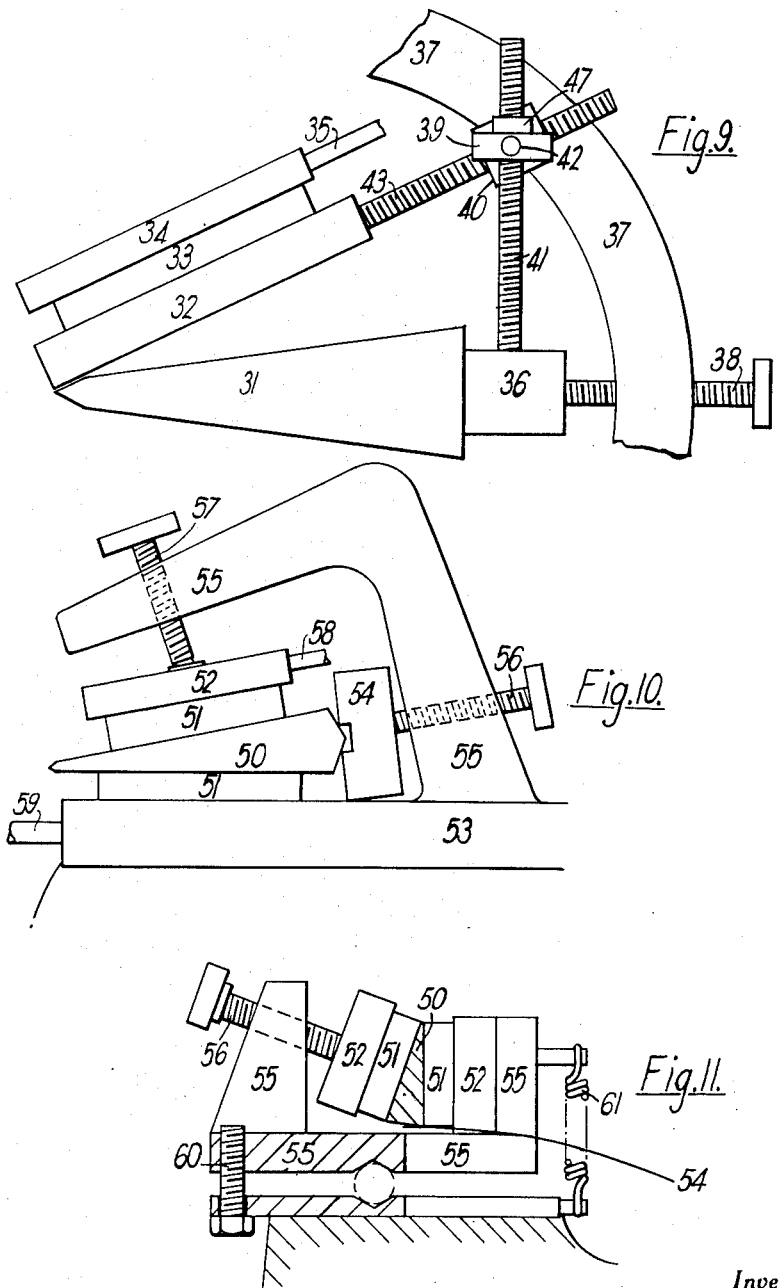

Aug. 31, 1965  J. H. ASHBY  3,203,290
MICROTOMES
Filed June 7, 1963  8 Sheets-Sheet 8
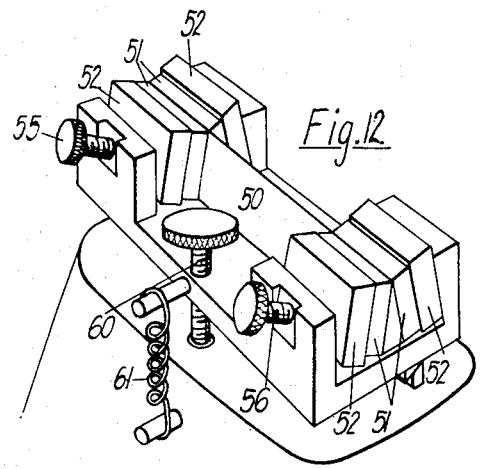
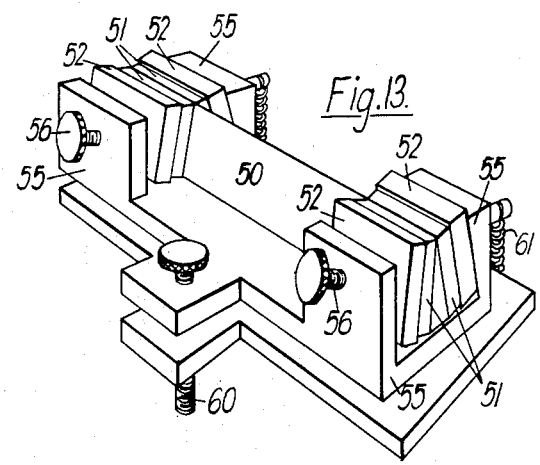
Inventor
JOHN HENRY ASHBY
By
Cushman, Darby & Cushman
Attorneys

United States Patent Office 3,203,290
Patented Aug. 31, 1965

3,203,290
MICROTOMES
John Henry Ashby, Piner, Middlesex, England, assignor to Frigistor Laboratories Limited, formerly known as Semiconductor Thermoelements Limited, Buckingham, England
Filed June 7, 1963, Ser. No. 286,236
Claims priority, application Great Britain, June 7, 1962, 22,152/62; Apr. 17, 1963, 15,200/63
2 Claims. (Cl. 83—171)

This invention relates to microtomes which can be used for cutting cold sections.

It is often important to be able to cut histological sections from frozen material quickly and reliably e.g. during a surgical operation to determine if the tissue can be malignant or not. The object of the present invention is to provide a device whereby this may readily be done.

According to the invention there is provided a microtome comprising a blade, means for thermoelectrically cooling such blade in a controllable manner and a microtome stage having independent thermoelectric means for controlling its temperature.

In the preferred embodiment of our invention the microtome stage is provided with a thermoelectric cooling and heating element and a second thermoelectric cooling and heating element is removably attached to the microtome blade. Preferably the blade is ground to a wedge-shaped cross-section.

The cooling elements may be flat wafers which, on passage of a suitable electric current, produce cooling on one face of the wafer and heating on the other face of the wafer. The wafers may comprise blocks of thermoelectric material of two types arranged in a planar array and connected electrically in series by thermally and electrically conducting connecting members such that adjacent blocks are of opposite conductivity type so that when the electric current is passed in a given direction, it will pass from a block of thermoelectric material of the first type to one of material of the second type via a connecting member situated on the one face of the array and then on to a block of the first type via a connecting member situated on the other face of the array and such that on passage of a suitable electric current the one face of the array will become hot and the other face will become cold. One example of such thermoelectric cooling wafers are those sold under the name "Frigistor." When such wafers are used for cooling, a heat transfer element is normally placed against the hot face (back face) to remove heat from it and attached in such a manner as to make good thermal contact with the connecting members on the hot face but electrically insulated therefrom. Connecting members on the cold face (front face) are placed in good thermal contact with the object or space to be cooled but, if need be, electrically insulated from it. The term "front face" is used to denote the face of the wafer which is placed in thermal contact with the object or space whose temperature is to be controlled and the term "back face" to denote the opposite face. The thermoelectric cooling wafers may be supplied, with an electrically insulating but thermally conducting layer attached to one or both faces.

Preferably at least one thermoelectric wafer is placed against each side of the blade, its front face against the blade with the interposition of a thin sheet of an electric insulating material which may be coated on at least one and preferably on both sides with a film of grease. This sheet should of course present as little resistance to the flow of heat as possible. The back faces of the thermoelectric wafers are placed in thermal contact with, but electrically insulated from heat transfer devices which preferably overlap the edges of the wafer, the overlapping portions suitably serving for attaching the assembly to the blade.

According to a further feature of the invention there is provided an anti-roll bar attached to the electrically cooled microtome blade.

Advantageously, the anti-roll bar is provided with thermoelectric cooling means. The thermoelectric cooling means attached to the anti-roll bar is preferably capable of separate control permitting its temperature to be varied independently to that of the blade.

In a preferred form of the invention the means of affixing to the blade the thermoelectric cooling means serving directly to cool the blade is utilized to support the anti-roll bar.

In order that the invention may more readily be understood the following description is given merely by way of example.

In the drawings:

FIGURE 4 is a perspective view of an alternative form of attaching yoke;

FIGURE 5 is a perspective view showing the attaching yoke in position;

FIGURE 6 illustrates a further alternative form of attachment;

FIGURE 7 shows one form of cooling wafer used in the microtome of FIGURE 1;

FIGURE 9 is an end elevation of the microtome of FIGURE 8; and

FIGURES 10 to 13 illustrate methods of holding thermoelectric cooling wafers against the microtome blade.

Figure 1:
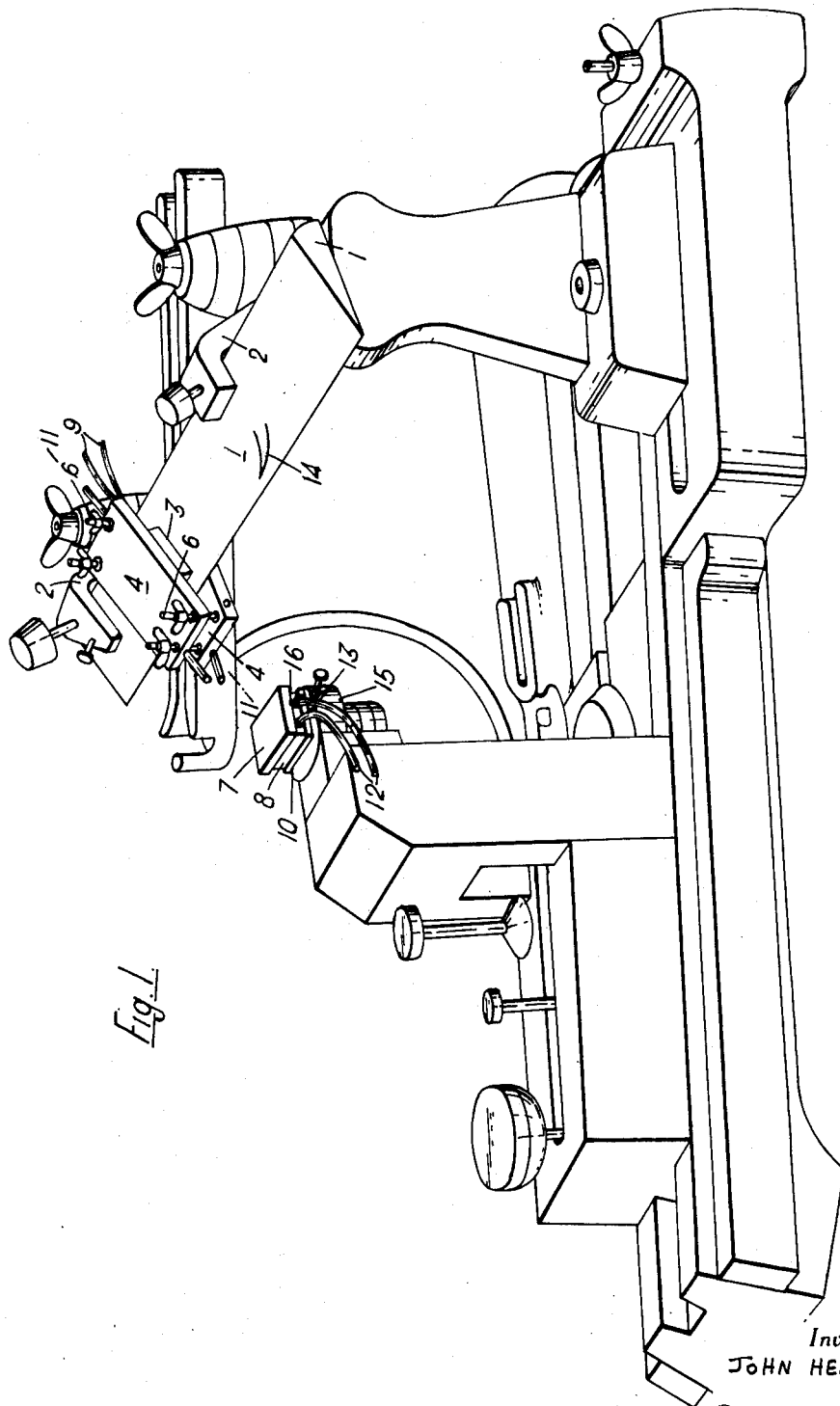
FIGURE 1 is a perspective view of a first embodiment of a microtome according to the invention.

Referring now to the drawings, the microtome illustrated in FIGURE 1 comprises a knife blade 1 with supports 2. The blade 1 is cooled by a pair of thermoelectric wafers 3 and 3′ of which only one is shown the other being on the under side of the knife blade. These wafers are supplied with current through leads 9 and Variac transformer control means which is shown diagrammatically at 70. With normal current direction the wafers have their cold side in thermal contact with the knife blade 1 and their hot side is cooled by heat transfer elements 4, 4′ supplied with cooling fluid by means of conduits 5. These cooling units are held in position with the aid of bolts 6, the mode of attachment being described below in greater detail.

A microtome stage or table 7 is cooled by a thermoelectric cooling wafer 8 which is supplied with current through leads 12 and Variac transformer control means which is shown diagrammatically at 71. With the normal direction of current the cold side of the wafer 8 is in thermal contact with the table 7 and its hot side is cooled by a heat transfer element 10 which in turn, is cooled by means of cooling fluid supplied through conduits 13 (only one shown).

The temperature of the blade is measured by a suitable thermometer thermistor or thermocouple placed on the blade at 14. The temperature of the cold table may be measured similarly. The stage 7 is conveniently a block of aluminium having a hole 16 for the insertion of a thermocouple or thermistor and a hole on its under side to fit a nylon bolt by means of which it is attached to the thermoelectric wafer, heat-exchange element and in some cases to a base 15.

Figure 2:
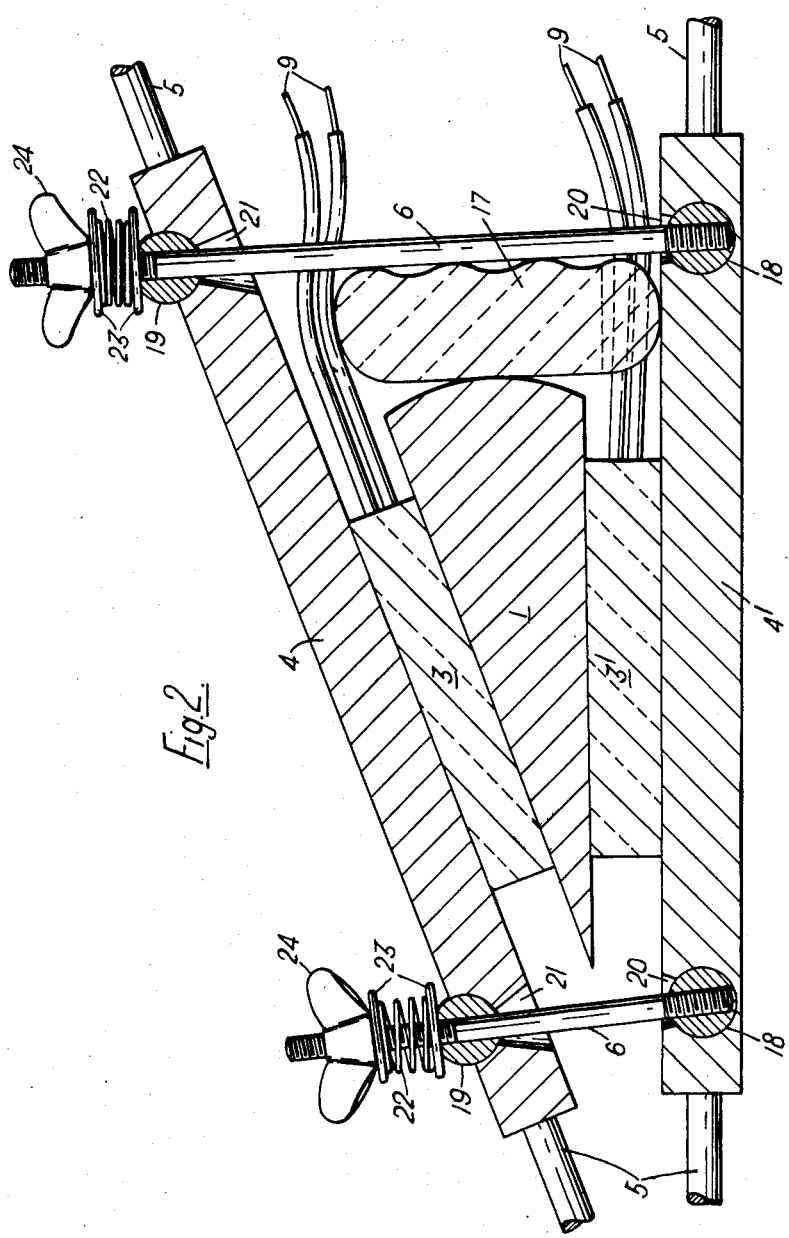
FIGURE 2 is a cross section on the line 11—11 of FIGURE 1.
Figure 3:
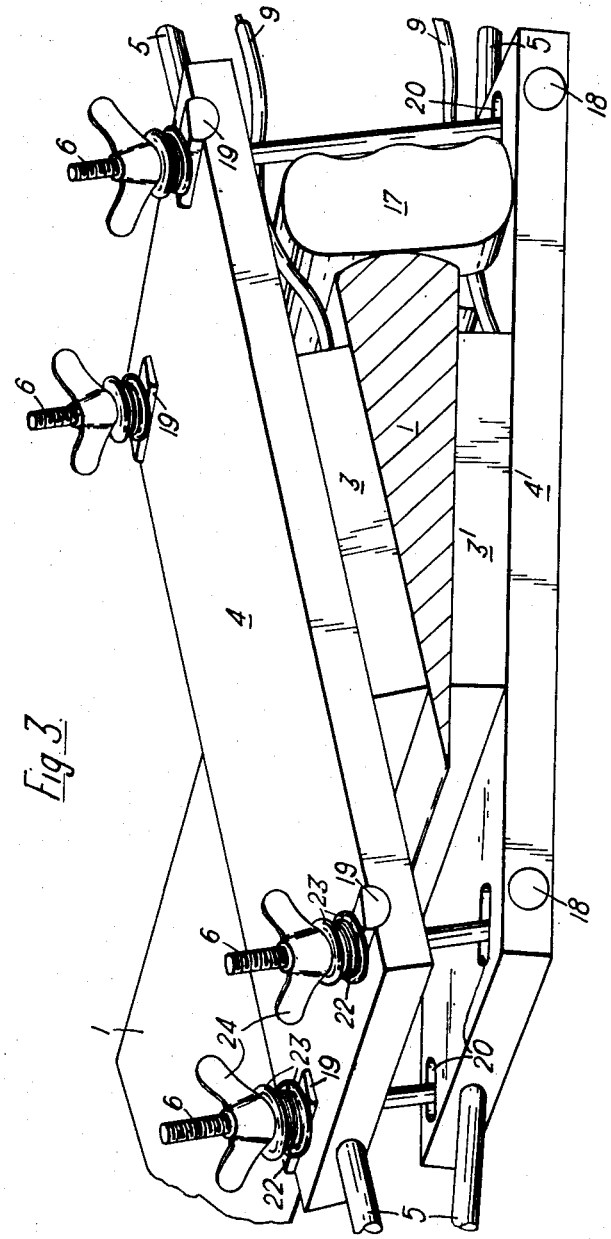
FIGURE 3 is a perspective view corresponding to FIGURE 2.

Referring to FIGURES 2 and 3, in a preferred form of attachment heat transfer units 4, 4' are fixed in position by means of bolts 6 threaded into cylindrical bearings, 18. The bearings 18 fit snugly into holes drilled in the side of the lower heat transfer unit 4' and carry blind holes in their curved surfaces into which the lower ends of the bolts 6 are threaded being preferably held permanently e.g. by soldering. The bolts have access to the bearings 18 by means of slots 20 running parallel with the long sides of heat transfer element 4' and having a thickness such that the bolts 6 fit snugly with no play in the direction of the short sides of element 4'.

The bolts 6 fit snugly through cylindrical bearings 19 having a flat face at right angles to the hole in which the bolts 6 run. The bearings 19 fit snugly in semi-cylindrical grooves in the heat transfer element 4. The lower surface of the heat-transfer elements 4 and the upper surface of element 4' are provided with slots 21 and 20 respectively running parallel with the long sides of the elements and fitting the bolts 6 snugly in a direction parallel with the short sides of element 4 so that the elements and the bolts 6 are free to move in the plane of FIGURE 3 and the bearings 18 and 19 are free to turn in this plane but the elements 4, 4', bolt 6 and bearings 18 and 19 are not free to move relative to each other at right angles to the plane of FIGURE 3. The bearings 19 are detachably held against the upper heat-transfer element 4 by means of wing-nuts 24 threaded on the bolts 6 and exerting pressure through the springs 22 held between upper and lower washers 23.

With this arrangement the heat-transfer elements 4, 4' serve to press the thermoelectric cooling wafers 3, 3' against the blade 1. The thermal contacts between the components 4 and 3, 3 and 1, 1 and 3', and 3' and 4' respectively can be improved, e.g. by means of a thin film of grease. This also serves to overcome any small variations from the plane in the surfaces of the knife-blade 1 and reduces the friction between the respective pairs of elements. To prevent the cooling wafers and heat-transfer members from sliding forward on the blade, the back bolts bear on a block 17 of insulating material abutting against the back of the blade 1. The block 17 is of suitable shape and size to permit the electrical leads 9 to pass readily and also to give minimum contact areas with the blade 7, the bolts 6 and the lower heat-exchange element 4'.

Another form of attachment to the blade is shown in FIGURES 4 and 5 and comprises a yoke 25 of heat insulating material, prefreably synthetic resin or rubber which may be formed and which fits the blade snugly. The thickness of any of the arms 26 of the yoke, in a direction perpendicular to that face of the knife-blade onto which the arm of the yoke fits is preferably very slightly less than the thickness of the thermoelectric cooling wafers 3, 3'. The heat-transfer elements 4, 4' are then made so as to overlap the said arms and to screw onto them thus pressing the thermoelectric cooling wafers firmly against the knife-blade. The pressure may be made more even by attaching clamps near to the "front" ends of the arms 26 or near to the "front" edges of the heat transfer units, the term "front" referring in this context to the edges or ends near the cutting edge of the knife-blade. The yokes may be made of material so springy as to permit them to be attached to and removed from the mounted knife blade. Grease and thin films are used as in the initially described form of attachment to achieve good thermal contact and electrical insulation.

The above forms of attachment are preferred for the cooling of large microtome blades mounted as shown in FIGURE 1. For attachment to smaller blades a large-size spring-back clip similar to a "bull dog" type of clip may be used as illustrated in FIGURE 6.

In another form of attachment thin magnets are placed on the microtome blade partially or completely to surround the area with which the thermoelectric cooling wafers will eventually be in contact. These magnets may be made thinner than the cooling wafers, or some other means may be adopted to ensure that they do not come into thermal contact with the heat transfer elements. In this way sliding of the thermoelectric cooling wafers relative to the microtome blades is prevented. The heat transfer elements may contain magnetic material or magnets may be attached to them in order to hold them and the thermoelectric cooling wafers against the blade. Pressure may then be applied to the heat transfer elements in any convenient manner to ensure thermal contact between the blade and the cold side of the cooling wafers and between the heat transfer elements and the hot side of the cooling wafers. The magnets may be used in conjunction with spring-back clips, the clips providing the pressure and the magnets preventing sliding.

The above forms of attachment are used with conventional microtome blades. However, blades may be designed specially for use in cutting frozen sections. One or more small holes are made and tapped in each face of the knife into which a nylon bolt threads, the heat transfer members and the thermoelectric cooling members being made with a hole through which the nylon bolt passes. Such a thermoelectric cooling member is shown in FIGURE 7. The blade is hardened and tempered after the holes have been drilled and tapped.

The cooling of the microtome stage can be accomplished using the arrangement in which the cold table 7 is in the form of a block of aluminium having a hole 16 (FIGURE 1) for the insertion of a thermocouple or thermistor and a hole to fit a nylon bolt tapped in its lower side by means of which it is attached to the thermoelectric wafer 8, heat-transfer element 10, and in some cases to the base 15. When a nylon bolt is used the thermoelements in the wafer 8 will be arranged in a convenient manner about the bolt hole, as shown in FIGURE 7. The heat transfer element 10 may be attached to the base 15 by means of screws inserted through the base 15 and passing into the heat-exchange element 10 or such attachment may be made in any other convenient manner.

Alternatively the cooling wafer and the heat-transfer element under the cooling wafer and the cold table on top of the cooling wafer are held in the normal vice attachment on the cold table.

Where very low temperatures of the cold table 7 may be required it may be cooled by any suitable multistage thermoelectric cooling unit. Alternatively a one stage thermoelectric cooling unit may be used, the associated heat-exchange member being cooled more severely e.g. by low-freezing-point liquids cooled by solid carbon dioxide.

The procedure for using the apparatus to obtain fine sections of frozen tissue is as follows. First the optimum temperature of both microtome blade and stage for cutting sections of the particular tissue are found. This may be done initially by a process of trial and error, but once found this process of trial and error need not be repeated. It may be that the optimum temperatures vary with other factors such as the thickness of the sections being cut, or the temperatures and relative humidity of the air around the samples, and it may be necessary to standardize the latter two factors by enclosing the whole apparatus in a cold box cooled to say 0° C. or in some cases to lower temperatures, and provided with draft excluders and baffles to prevent the exhaled air from the operator from contacting the specimen. If desired the cold box may contain drying agents such as silica gel or other means of drying the air to prevent condensation of moisture on the specimen.

Where very low temperatures are required the cold-box itself may be cooled thermoelectrically or by other means. Alternatively the heat-transfer members in thermal contact with the hot faces of the thermoelectric cooling wafers may be cooled with specially cooled low-freezing-point liquids passed through the conduits 5 instead of water. Other forms of cooling may be applied to the blade such as would by themselves give a steady temperature higher than that required, the further cooling and exact temperature control being obtained thermoelectrically as described above.

In use, a steady desired temperature may be attained by adjusting the current supply to the cooling unit on the microtome table and separately adjusting the current supply to the cooling unit on the microtome blade.

While the invention has been particularly described by reference to devices in which the cooling unit on the microtome blade comprises a pair of thermoelectric cool-in wafers and appropriate heat-transfer members and means of attachment, if desired two or more such pairs may be used, or on the other hand a single thermoelectric cooling wafer may suffice.

The attaining of a steady temperature at any one point e.g. at the blade or at the cold-table or at both may be rendered automatic by means of a relay which controls the current supply to the thermoelectric cooling wafer serving to cool the said point, the relay being actuated by a thermistor or thermocouple or other suitable device operated by the temperature of the said point. When a suitable thermostatic control has been incorporated, it is possible to use non-steady means of cooling in addition to the thermoelectric cooling, e.g. lumps of solid carbon dioxide may be placed on the microtome blade remote from the cutting region of the blade.

It has been found that, once the optimum temperatures of blade and microtome stage for cutting sections of the particular thickness of the particular material have been determined, and the microtome stage and blade have been brought to these optimum temperatures, high quality sections of great thinness can be cut reliably and rapidly. It should be noted that the temperatures of the microtome blade and of the stage are not necessarily equal to each other.

*Example.*—A knife cooling unit consisted of four wafers and associated heat-transfer means. The wafers were clipped on the knife, two above and two below the cutting surface. A further single cooling wafer and associated heat-transfer element were attached to the microscope stage. The working temperatures of the stage and knife cooling units were now controlled by using two separate power packs, each giving a current up to 15 amps at 6 volts. The current flows were regulated by Variac transformers. Thermocouples were attached to the cooled table and near the cutting edge of the knife to record the cooling rates (FIG. 1).

A current flow of 7 amps cooled the knife to −17.5° C. in 6 minutes, the current flow was increased to 12 amps and the knife cooled to −23.5° C. in 10 minutes. A current flow of 10 amps cooled mouse liver to −21° C. in 5 minutes.

It was not found possible to cut flat consecutive sections with a stage temperature of −21° C. and a knife temperature of −23.5° C. Reducing the current flow on the stage unit to 4.5 amps raised the temperature to −9° C. Sections could be cut but curled on the knife. The current flow to the knife unit was then reduced to 3 amps raising the temperature to −13° C. and at this temperature flat consecutive sections were obtained. The sections were easily transferred to a glass slide at room temperature (21° C. ambient).

It was found that there is often an optimum cutting temperature for any particular tissue and that there is also an optimum knife temperature.

It will be understood that modifications in the arrangements described above may be made. For example the microtome blade and/or the stage can be provided with heat insulation to reduce the transfer of heat thereto from the surrounding atmosphere or from other parts of the microtome. Such insulation must of course not interfere to any any important degree with the cutting action of the knife or with the firmness and precision with which the blade is held and operated.

The use of anti-roll bars has been shown to be of great assistance for cutting very thin frozen sections.

By the term "anti-roll bar" is meant a bar positioned closely adjacent to the microtome blade to prevent the section cut by the blade from rolling up on itself.

However, the temperature of the anti-roll bar is critical and it is normally controlled indirectly by placing the microtome together with all its accessories in a cooled chamber, since if the temperature of the anti-roll bar is too high it will melt the surface of the cut sections. If its temperature falls too low it picks up quantities of condensed moisture which make its surface uneven, and interfere with the cutting action. Conveniently, the temperature of the anti-roll bar is maintained at just below 0° C.

Figure 8:
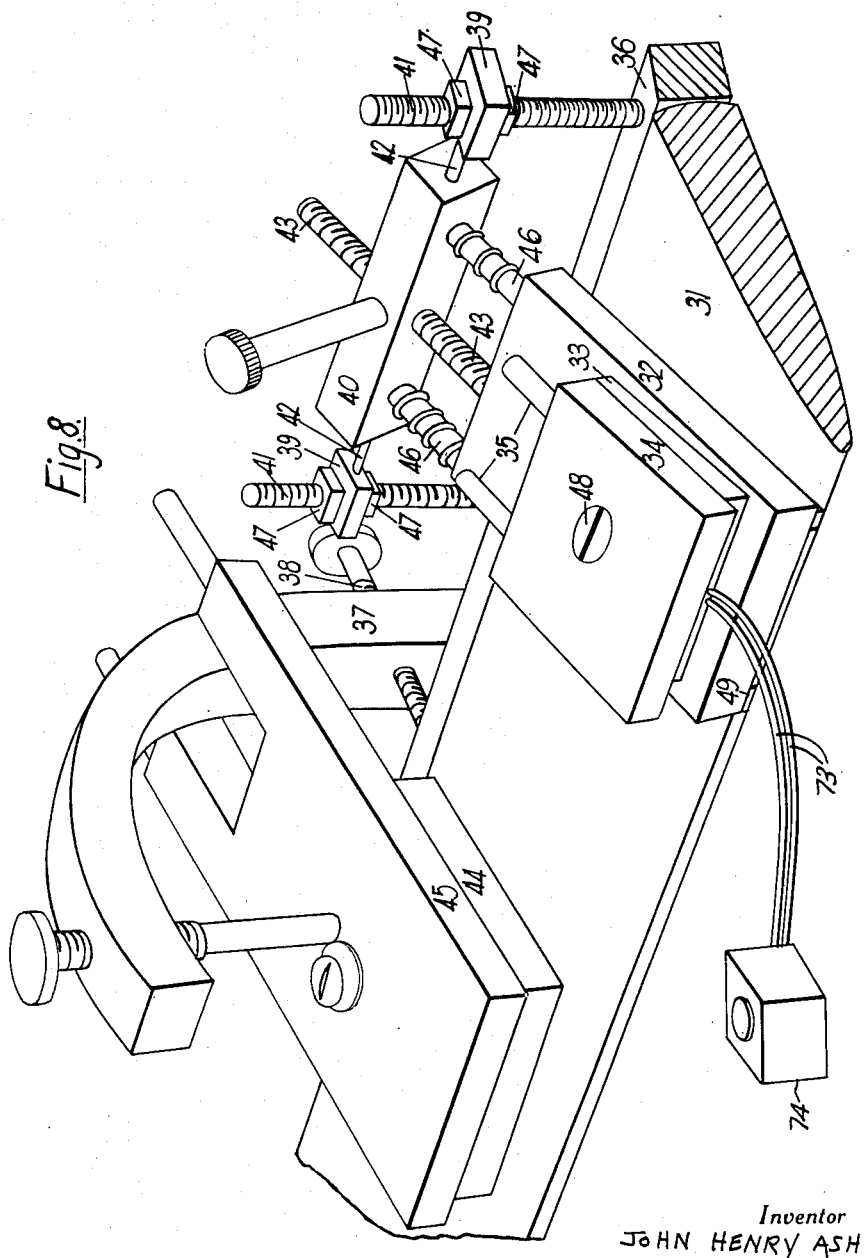
FIGURE 8 is a perspective view of a further form of thermoelectrically cooled microtome according to the invention.

In FIGURE 8, the microtome blade 31 is supported on supports (not shown): the other attachments shown are directly or indirectly supported on the blade. The attachments include an anti-roll bar 32, which is spaced from the blade 31 by spacers 49 and to which is attached by means of a nylon bolt 48 or by other suitable means a thermoelectric cooling module 33 which is supplied with current through leads 73 and a Variac transformer control means as shown at 74 and a heat transfer element 34 supplied with water through the tubes 35.

A pair of C-clamps 37 of which only one is shown, hold the thermoelements 44 and associated heat transfer elements 45 and also, by means of screw 38, hold a bar 36 against the blade 31; only one of the thermoelements and heat transfer elements are shown the other being held by the shown C-clamp, lies symmetrically placed beneath the blade 31. On the bar 36 screws 41 and pairs of nuts 47 each support a washer 39. Washers 39 are joined by pivots 42 on which are mounted a second bar 40 to which the anti-roll bar 32 is adjustably secured by means of a screw 43, and guide rods 46 fitted with springs. The screws 41 are long enough to permit the anti-roll bar to be adjusted parallel, to the honed portion of the microtome blade.

Referring now to the forms of attachment shown in FIGURES 2 and 3, rods 6 bear on the irregularly shaped block 17. The bar 36 of FIGURES 8 and 9 can be supported on these rods which may be threaded to support the bar 36 more securely. Optionally the bar 36 may be constructed of heat insulating material and may be integral with the block 17 of FIGURES 2 and 3.

The frames 25 of FIGURES 4 and 5 may each have attached to them a portion of the bar 36 such portions having attached to them the screws 41 and the washers 39 which support the anti-roll bar in the manner shown in FIGURES 8 and 9.

To reduce heat paths to the microtome blade 31, the bar 36 or that part of it in contact with the blade 31 may be made of heat insulating material. In cases where the rear edge of the microtome is curved convexly the corresponding edge of the bar 36 can be given a similar concave curve to give firmer holding.

According to Linderstrom-Lang and Mogensen in Comptes-rendus Lab. Carlsberg, Ser. Chim., vol. 23, No. 4, pages 28–31 (1938) it is necessary to take consecutive sections without interruption to maintain constant thickness of the sections. These authors found the anti-roll bar and a cooled box surrounding the microtome were necessary for this. We have found that by use of independent cooling of and temperature control of the specimen, the knife blade and the anti-roll bar, we can achieve good consecutive sections without interruption and without the need for a cooled box around the microtome.

A further way in which thermoelectric cooling elements may be held against the microtome blade is by interposing them under the screws which secure the blade on its supports.

FIGURES 10, 11, 12 and 13 illustrate this manner of holding the modules and blade. FIGURE 10 relates to a sliding-type microtome and FIGURES 11, 12 and 13 relate to microtomes in which the specimen is held on a rocker arm.

Referring to FIGURE 10 the blade 50 and thermoelectric cooling modules 51 and a heat sink 52 are held by means of a screw 57 between a jaw 55 and a base 53. The base and jaw are rigidly attached to each other and can be tilted by suitable means (not shown), to give the desired angle for the blade. The blade 50 is wedged between the upper and lower thermoelectric cooling elements 51 and the heat insulating member 54 which is adjusted by means of the screw 56. The thermoelectric cooling elements 51 are in thermal contact on the one face with the blade 50 and on the opposite faces with the heat sinks. The upper heat sink is shown at 52 and the lower heat sink may be similar, or may be a hollowed out portion of the casting 53 which together with the upper casting 55 forms a jaw. Water or other suitable cooling fluid is circulated through the heat sinks by means of tubes 58 and 59.

In FIGURES 11, 12 and 13 the microtome blade 50 is wedged between thermoelectric cooling units 51 in close thermal contact with it and with heat sinks 52 being compressed by means of the screws 56 between the jaws 55 and the back-edge of the knife blade being held against the base of the jaws 55 directly or preferably with the interposition of a heat-insulating packing 54. The angle of tilt of this assembly is adjusted by means of the screw 60 which together with the spring 61 hold it against the base.

The block of insulating material 54 shown in FIGURE 10 may be used to support an anti-roll bar, in the same way as the bar 36 in FIGURE 8.

It has been found preferable in use of the microtomes of this invention to wipe both the blade and anti-roll bar, between each cut, to remove condensed moisture.

The advantages of the invention may be summarized as follows:

(a) It provides for rapidly bringing the temperatures of stage and knife to a desired low level.

(b) The optimum temperatures for stage and knife can be maintained indefinitely and controlled independently.

(c) Flat consecutive sections can be cut at room temperature without a cold cabinet.

(d) The conventional methods of cooling can be dispensed with.

(e) The clip-on knife and stage units can be easily adapted to suit sliding, sledge or freezing microtomes.

(f) Sliding and sledge microtomes can be quickly converted from cutting paraffin or celloidin sections to cutting fixed or unfixed frozen sections.

I claim:

1. A microtome comprising a blade, a first thermoelectric element thermally connected to the blade, first control means adjustable to control the flow of current to the first thermoelectric element and hence the transfer of heat between the blade and the element, a stage, a second thermoelectric element thermally connected to the stage, second control means adjustable independently of the adjustment of the first control means to control the flow of current to the second thermoelectric element and hence the transfer of heat between the stage and the second thermoelectric element, and an anti-roll bar attached to the blade, wherein each thermoelectric element includes blocks of thermoelectric material of two types arranged in a planar array and connected electrically in series by thermally and electrically conducting members such that adjacent blocks are of opposite conductivity type, and each thermoelectric element has on one or both of its faces an electrically insulating but thermally conducting layer.

2. A microtome as claimed in claim 1 including a thermoelectric element connected thermally to the anti-roll bar, and means to control the transfer of heat between the anti-roll bar and its thermoelectric element independently of the first mentioned control means.

References Cited by the Examiner

UNITED STATES PATENTS

| 633,310 | 9/99 | Gaylord | 83—915.5 |
|---|---|---|---|
| 2,292,973 | 8/42 | Richards | 83—915.5 |
| 2,590,725 | 3/52 | Sanger | 83—171 |
| 2,629,230 | 2/53 | Turner | 83—170 |
| 2,643,579 | 6/53 | Jacoby | 83—171 |
| 2,901,944 | 9/59 | Sparer | 83—915.5 |
| 2,942,051 | 6/60 | Roeder | 136—4.2 |
| 2,991,628 | 7/61 | Tuck | 136—4.2 |
| 3,091,144 | 5/63 | Villalobos | 83—15 |
| 3,093,135 | 6/63 | Hirschhorn | 62—3 |
| 3,137,184 | 6/64 | Meyers | 83—171 |

FOREIGN PATENTS 768,337  2/57  Great Britain.

WILLIAM W. DYER, Jr., *Primary Examiner*

HUNTER C. BOURNE, Jr., ANDREW R. JUHASZ, *Examiners.*